United States Patent [19]

Bodine

[11] Patent Number: 4,593,490
[45] Date of Patent: Jun. 10, 1986

[54] PLANTERS

[75] Inventor: Paul D. Bodine, Old Greenwich, Conn.

[73] Assignee: S. B. Green Partnership, Old Greenwich, Conn.

[21] Appl. No.: 658,178

[22] Filed: Oct. 5, 1984

[51] Int. Cl.[4] ............................................. A01G 25/00
[52] U.S. Cl. ............................................. 47/79; 47/82
[58] Field of Search .............. 47/79, 82, 83, 81, 66, 47/68, 79, 48.5, 18, 19, 80; 248/225.1, 225.2; 211/88

[56] References Cited

U.S. PATENT DOCUMENTS

| 253,611 | 2/1882 | Johnston | 47/80 |
|---|---|---|---|
| 1,707,551 | 4/1929 | Hale | 47/79 |
| 1,948,031 | 2/1934 | Guille | 47/79 |
| 2,404,370 | 7/1946 | Fowlkes | 47/66 |
| 2,738,621 | 3/1956 | Abbrecht | 47/79 |

FOREIGN PATENT DOCUMENTS

| 3238967 | 10/1982 | Fed. Rep. of Germany | 47/71 |
|---|---|---|---|
| 463978 | 4/1937 | United Kingdom | 47/80 |

Primary Examiner—Robert E. Bagwill
Assistant Examiner—Bradley M. Lewis

[57] ABSTRACT

A plurality of planters may be used free standing or arranged in a bracket assembly to form a hanging garden. The planter has a unique water-management system. The planter comprises a unitary plastic piece having a chamber therein in which flowers or plants may be planted. A watering chamber, having a plurality of holes at the bottom thereof, allows water into the planted soil well above the bottom of the planting chamber. Excess water passes through drainage/reabsorption holes at the bottom of the planting chamber and into drainage chambers. Erosion baffles operate to impede the flow of water along the convexly curved bottom of the planting chamber preventing and controlling fine soil erosion. The drainage chamber allows for visual inspection of the water level and provides for reabsorption of excess water by the plant's roots as needed. The watering and drainage holes provide for aeration of the roots of plants in the planting chamber when all water in the respective watering and drainage chamber has been absorbed.

15 Claims, 6 Drawing Figures

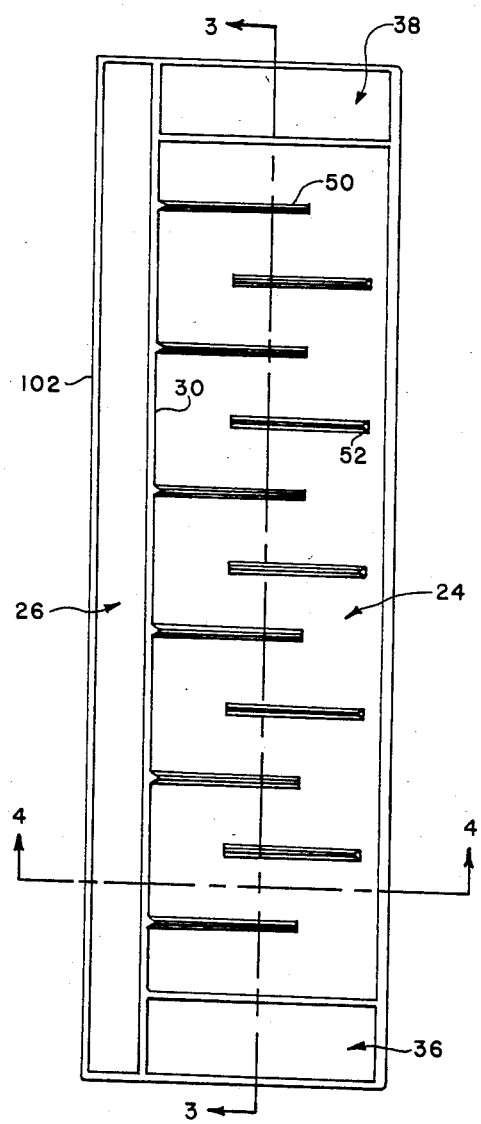

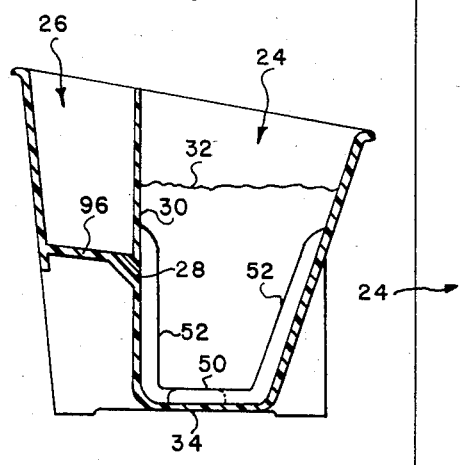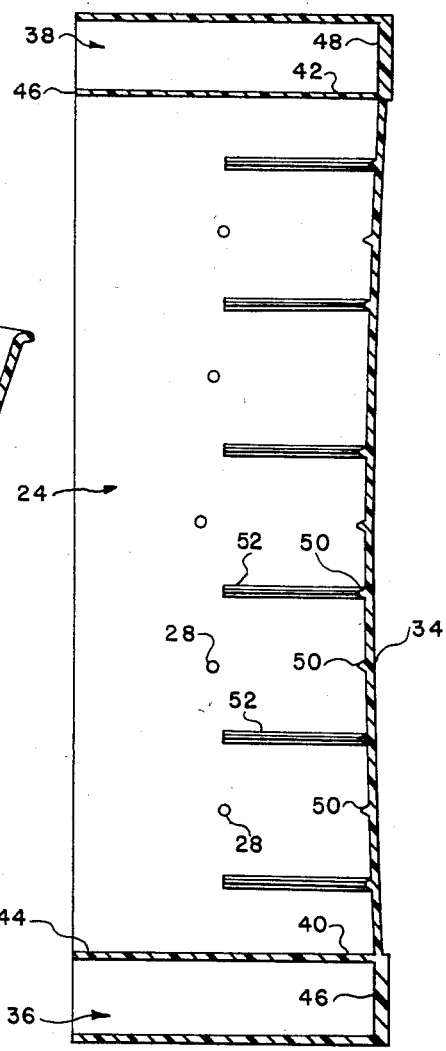

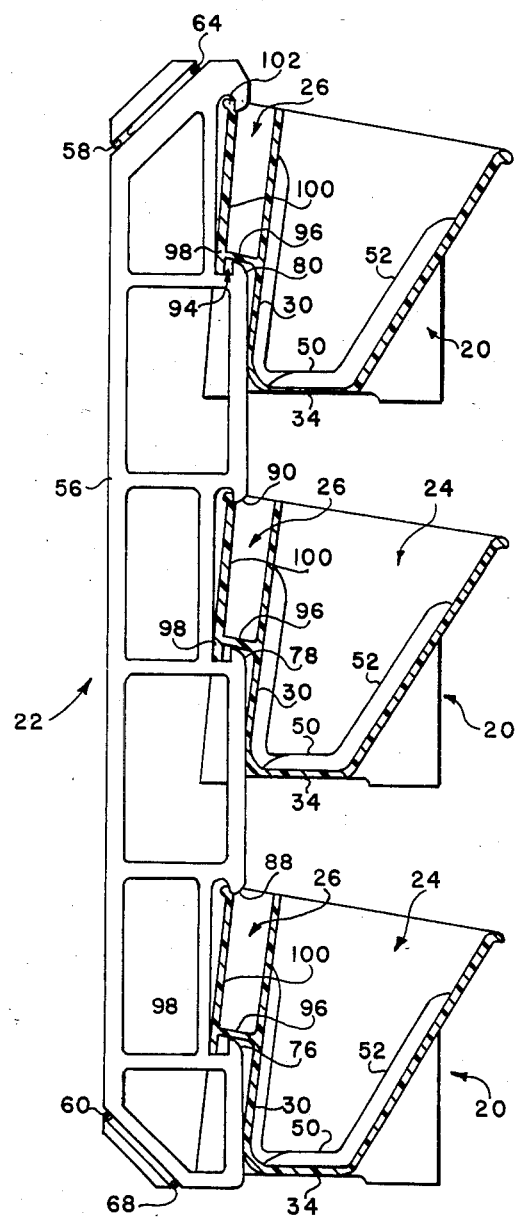

PLANTERS

TECHNICAL FIELD

This invention relates to planters, and more particularly relates to planters, for flowers or plants, having a water management system and adapted for both free standing and hanging garden use.

BACKGROUND ART

Planters comprising certain elements or features of the planter of the present invention are known. Such planters are disclosed in the following U.S. Pat. No.: 1,170,402, entitled "Flower Box"; U.S. Pat. No. 1,213,331, entitled "Flower and Plant Box"; U.S. Pat. No. 1,623,720, entitled "Irrigated and Ventilated Flower Box"; U.S. Pat. No. 1,948,031, entitled "Self Feeding Flowerpot"; U.S. Pat. No. 2,782,562, entitled "Flower Box"; and U.S. Pat. No. 4,055,022, entitled "Planter". However, no prior art planter employs the unique water management system of the present invention. Specifically, none combined the features of a water management system comprising a plant chamber having a convexly shaped (sloped) bottom, erosion baffles, drainage/reabsorption chambers, and a midsoil input watering chamber which act to prevent excessive watering and aid in reabsorption of water by the plant as needed, allow aeration of the planting medium, and thereby providing an improved environment for potted flowers and plants.

Hanging garden arrangements of a plurality of planters are known, for example, see U.S. Pat. No. 4,295,296, entitled "Vertical Garden".

DISCLOSURE OF THE INVENTION

According to the invention a plurality of planters generally indicated at 20 in FIG. 1 are provided in a hanging garden arrangement as illustrated in FIG. 6. The planters are engaged by identical pair of brackets 54 and 56 as shown in FIG. 5, which are assembled with a pair of wire bales 58 and 60 which snap into slots at either end of the brackets 54 and 56. The planters are provided with a pair of opposing lips as shown at 98 and 102 in FIG. 6, so that they may be engaged into the brackets 56 and 58.

The unique water management system of the invention is accomplished by providing the planter 20 with a watering chamber generally indicated at 26 in FIG. 1, the bottom 96 of which terminates in a plurality of channels 28 into the midportion of the back wall of the plant chamber 24 (FIG. 4), so that the water is introduced below the top level 32 of the soil or planting medium and above the bottom 34 of the planting chamber 24.

A pair of drainage chambers 36 and 38 are provided (see FIGS. 1 and 2) on opposite end walls of the planting chamber 24 and the bottom 34 of the planting chamber is sloped towards them. Openings 40 and 42 are provided between the planting chamber and the drainage chambers. Normal watering will cause some water to collect for a short time (a few minutes) in the drainage chambers. Excess water collects in the drainage chambers. This water can be seen through the open tops thereof. If it remains for an excessive time period, this indicates that there has been excess watering. The water from the drainage chambers 36 and 38 may be reabsorbed since the bottoms 46 and 48 of the drainage chambers are preferably at the same level as the lowest levels of the bottom 34 of the planting chamber 24, but can be somewhat lower. When all the water has been reabsorbed, the openings 40 and 42 and channels 28 provide direct aeration of the roots of plants in the planting medium. In order to prevent erosion of the planting medium as the water drains into the drainage chambers 36 and 38, erosion ridges 50 are provided which as shown in FIG. 2, provide for a circuitous path of water draining into the drainage chambers.

If the plants require it, water and liquid fertilizer may be supplied to the bottom of the roots by pouring them directly into the drainage chambers 36 and 38.

OBJECTS OF THE INVENTION

It is therefore an object of the present invention to provide a planter having an improved water-management system.

It is another object of the present invention to provide a planter that allows for simple visual inspection of the water level.

It is still another object of the present invention to provide a planter that provides control of fine soil erosion.

It is still another object of the present invention to provide a water metering system which disperses uniform amounts of water and liquid fertilizer throughout the planter directly into the root system.

Still another object of the present invention is to provide a planter which will allow reabsorption of excess water as needed.

A further object of the invention is to provide a planter that provides aeration directly into the root system.

A still further object of the present invention is to provide a planter comprised of material which is impervious to water but not to oxygen.

Yet another object of the present invention is to provide a planter which may be free standing or mounted in a rack with a plurality of like planters.

Still another object of the present invention is to provide a plurality of planters of the above character in a hanging garden.

A further object of the invention is to provide a unique bracket system for supporting a plurality of planters in a hanging garden.

Other objects of the present invention will in part be obvious and will in part appear hereinafter.

The invention accordingly comprises the features of constructions, elements, and arrangements of parts and articles of manufacture suggesting the features, properties, and relations of elements, all of which will be exemplified in the articles and constructions hereinafter described. The scope of the invention will be indicated in the claims.

BRIEF DESCRIPTION OF THE DRAWINGS

For a fuller understanding of the nature and objects of the invention, reference should be had to the following drawings, in which:

FIG. 2 is a top view of the planter shown in FIG. 1;

FIG. 3 is a cross sectional view along the lines 3—3 of FIG. 2;

FIG. 4 is a cross sectional view along the lines 4—4 of FIG. 2;

FIG. 6 is a cross sectional view taken from the plane 6—6 shown in FIG. 5 with the planters 20 according to the invention mounted within the bracket assembly shown in FIG. 5.

The same reference characters refer to the same elements throughout the several views of the drawings.

BEST MODE FOR CARRYING OUT THE INVENTION

Figure 1:
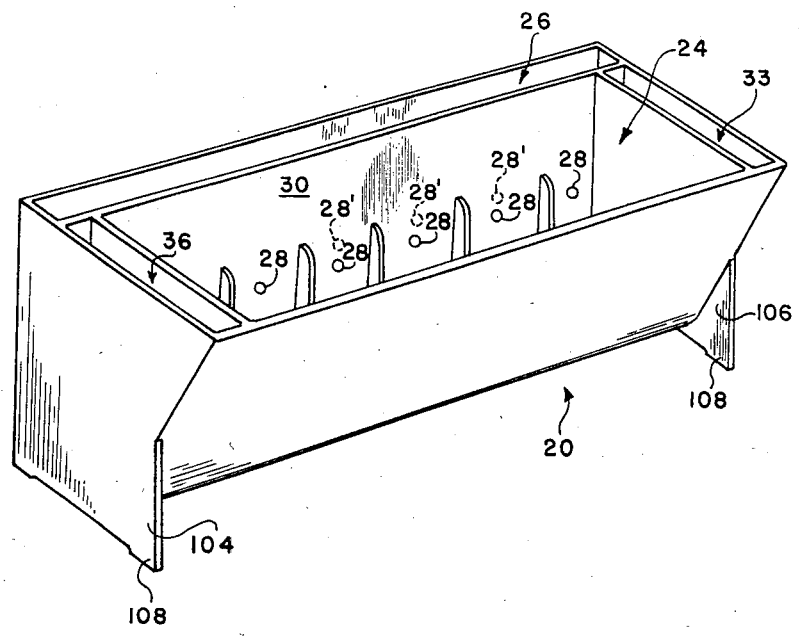
FIG. 1 is a perspective view of a planter according to the invention.

According to the invention, a plurality of planters 20 are provided, each constructed as shown in FIG. 1. The plurality of planters are vertically arranged and mounted in a bracket assembly 22, shown in FIG. 5, in the manner illustrated in FIG. 6 where the planters 20 are shown in cross section.

Again referring to FIG. 1, each planter is provided with a unique water management system for the plant chamber generally indicated at 24. The water management system comprises a watering chamber 26 at the back of the plant chamber 24, provided with a plurality of watering openings 28 in the common wall 30 between the plant chamber 24 and the watering chamber 26. As shown in FIG. 4, the openings 28 are located at the bottom of the watering chamber 26 and intermediate of the top and bottom of the plant chamber 24, so that the water enters between the top and bottom of the planting medium in the plant chamber 24; the top surface of the planting media being at 32 as shown in FIG. 4, for example. The watering chamber accepts a predetermined amount of water only and then slowly allows it to drain into the plant chamber 24 substantially at the midpoint of the roots of the plants planted therein. Excess water will, of course, pass to the bottom 34 of the plant chamber 24.

Again referring to FIG. 1, on either side of the plant chamber 24 are drainage chambers generally indicated at 36 and 38. The top edges of the walls of the chambers 24,26,36,28 are at substantially the same height. As shown in FIG. 3, the bottom 34 of plant chamber 24 slopes from the middle thereof to the nearest drainage chamber. One or more openings 40, 42, are located in the walls 44 and 46 between the drainage chambers 36 and 38 and the plant chamber 24, to collect the excess water. The openings 40 and 42 are preferably directly adjacent the bottoms 46 and 48 of the drainage chambers 36 and 38 which are at the same height as the lowest portions of the bottom 34 of the plant chamber 24, so that after excess water collects in the drainage chambers 36 and 38, it may be reabsorbed into the plant chamber as the soil or planting medium therein dries out. The bottom 34 of the plant chamber 24 is provided with a plurality of upstanding baffles 50.

The baffles do not extend across the entire bottom and are staggered as best seen in FIG. 2 to provide a circuitous path for water moving from the midpoint of the bottom 34 to the drainage chambers 36 and 38. The baffles prevent erosion of the soil or planting medium in the planter 24 and may be extended up the side walls as shown at 52 in FIG. 3, to reinforce the planter when it is molded from plastic or other material.

After initially filling the watering chamber 26 to the top, the gardener may later look in the drainage chambers 36 and 38 to see excess water at the bottom thereof. When the water has been totally reabsorbed, the gardener knows it is time to again fill the watering chamber to the top, thus metering the correct amount of water into the plant chamber 24 only when it is required.

Figure 5:
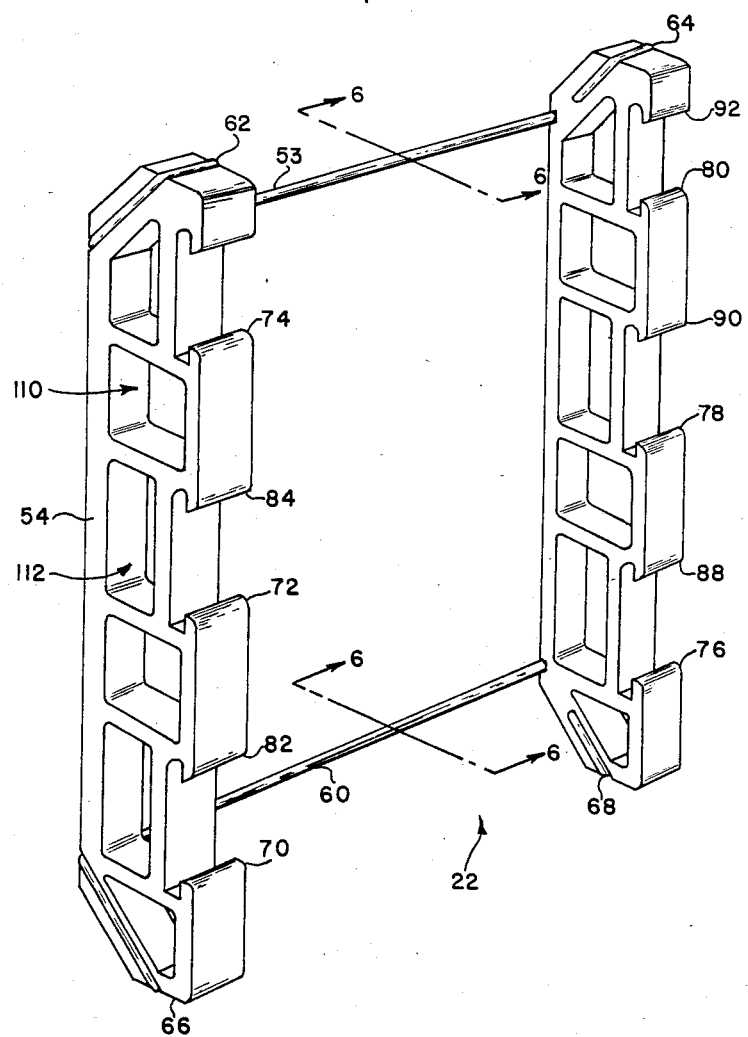
FIG. 5 is a perspective view of a bracket assembly for a hanging garden according to the invention.

As shown in FIG. 5, a pair of identical upstanding brackets 54 and 56, which may be of plastic material, are held rigidly by a pair of wire bales 58 and 60, each of which snap into slots 62, 64, 66, and 68, each extending on three sides of its respective bracket. The bracket assembly 22, shown in FIG. 5, may support three planters between upstanding hooks 70, 72, 74, 76, 78, and 80, and respective downward facing hooks 82, 84, 86, 88, 90, and 92. As shown in FIG. 6, the upwardly facing hooks engage a slot 94 formed by the bottom 96 of the watering chamber 26, the rear wall 30 of the planting chamber 24 and a downward extension 98 of the rear wall 100 of the watering chamber 26. The downwardly facing hooks engage the upper edge 102 of the rear wall 100 of the watering chamber 26. The hanging garden may be hung on a wall by a pair of picture hangers engaging the upper wire bale 58 as shown in FIG. 5.

Again referring to FIG. 1, each planter 20 is provided with a pair of side walls 104 and 106 which are mirror images of each other, and terminate in feet 108. Thus, the planter 20 may be used free standing as well as in the hanging garden arrangement shown in FIG. 6.

As best seen in FIG. 4, the openings or channels 28 between the watering chamber 26 and the planting chamber 24 preferably slope downwardly, so they are self-cleaning and do not clog. Some of them may be at higher positions in the common wall 30 between the watering chamber 20 and the planting chamber 24 in order to direct differing amounts of water across the planting chamber 24; the lowermost holes of course providing the most water since they continue to provide water until the watering chamber 26 is empty. The shape of the erosion preventing ridges 50 and their reinforcing extensions 52 can also be best seen in FIG. 4.

As illustrated in FIG. 5, the brackets 54 and 56 may be provided with a plurality of openings, for example, 110 and 112 therein, to conserve material.

The preferred form of the invention is a hanging garden kit comprising the brackets 54 and 56 and bales 58 and 60 disassembled, with three planters 20, which may be conveniently assembled by the user by snapping the bales 58 and 60 into the grooves 62, 64, 66, and 68, as shown in FIG. 5, and then hooking the planters 20 into the brakets 54 and 56, as shown in FIG. 6.

The dimensions of the planter 20 may be widely varied. The preferred dimensions are as follows:

| Height | 4 inches |
| Depth | 3½ inches |
| Length | 10–12 inches |

The preferred dimensions of the bracket assembly are as follows:

| Height | 13–15 inches |
| Depth | 1–1½ inches |
| Width | 8 inches |

The watering openings 28 are approximately ⅛ to ¼ inches in diameter.

The foregoing dimensions are not intended to be limiting, as the dimensions may be widely varied without departing from the scope of the invention. The planters may be curved, if desired. For example, two generally semicircular planters fit together to form a hanging circular garden.

Preferably, the planter 20 is comprised of a unitary piece of plastic, for example, polypropylene or polystyrene. Most plastics provide oxygen permeability, which is desirable, but ceramic (or concrete) could be used for large planters.

Alternatively, the watering openings 28' (FIGS. 1 and 3) may be higher in the middle. Openings 28' allow more water to be directed to the sides of the planter 20. This is desirable because the periphery may require additional watering as a result of greater evaporation at the sides of the planter 20.

The ratio of the volume of the plant chamber 24 to the watering chamber 26 should be 5 or 6 to 1 (15–25%).

The drainage chambers 36 and 38 should be as small as practical, comprising between 5% and 15% of the volume of the planter 20.

Erosion baffles 52 should be between 1/16 and 3/16 inch in height, with ⅛ inch preferred. The erosion baffles 52 may go all the way up the side 34 for increased rigidity.

Drainage openings 40 and 42 are preferably approximately 3/16 inch in diameter. Drainage holes 40 and 42 are located at the bottom of the plant chamber 24.

It will thus be seen that the objects set forth above among those made apparent from the preceeding description are efficiently attained and since certain changes may be made in the articles and constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features herein described, and all statements of the scope of the invention which, as a matter of language, might be said to fall therebetween.

Having described the invention, what we claim as new and desire to secure by Letters Patent is:

1. A planter comprising:
    an open topped elongated plant chamber having a bottom, with a front wall, a back wall and two side walls depending from said bottom and extending generally upwardly therefrom with the top edges thereof at substantially the same height, said plant chamber being adapted to contain a planting medium;
    an open topped watering chamber affixed to said back of said plant chamber and extending along said back between said two ends, said watering chamber extending from the top edge of said back wall of said plant chamber downwardly for a distance less than the full height of said back wall and having a bottom midway of the height of said back wall, channel means extending from adjacent the bottom of said watering chamber through said back wall, thereby enabling water introduced in said watering chamber to flow into said plant chamber within a planting medium contained in said plant chamber; and
    a drainage chamber affixed to each of said two side walls of said plant chamber, said drainage chambers extending for substantially the full height of said side walls and communicating with said plant chamber by way of openings extending through said side walls adjacent said bottom of said plant chamber, said drainage chambers being open topped to enable viewing of the level of water therein;
    said bottom of said plant chamber being sloped from the center thereof downwardly toward each of said side walls.

2. The planter of claim 1 wherein said said channel means comprises a plurality of holes extending through said back wall.

3. The planter of claim 2 wherein said holes are inclines downwardly from said watering chamber to said plant chamber, whereby said holes are self cleaning and inhibit clogging thereof.

4. The planter of claim 2 wherein at least one of said holes closer to said one of said side walls extend through said back wall farther from the top of said back wall than at least another of said holes that is farther from said one side wall.

5. The planter of claim 1 wherein baffle means is provided on the top of said bottom of said plant chamber for directing water entering said plant chamber circuitously along said bottom of said plant chamber toward said openings in said side walls.

6. The planter of claim 5 wherein said baffle means comprises ridges extending partially across the top of said bottom of said plant chamber alternately from said front and back walls.

7. The planter of claim 6 wherein alternate ridges extending from said front and back walls and extend upwardly along said front a back walls respectively.

8. The planter of claim 6 wherein said ridges have heights from 1/16 to 3/32 inch.

9. The planter of claim 1 wherein said watering chamber has a volume of from 15 to 25% of the volume of said plant chamber.

10. The planter of claim 1 wherein said drainage chambers each have a volume of from 5 to 15% of that of said plant chamber.

11. A planter comprising:
    an open topped elongated plant chamber having a bottom, with a front wall, a back wall and two side walls depending from said bottom and extending generally upwardly therefrom with the top edges thereof at substantially the same height, said plant chamber being adapted to contain a planting medium;
    an open topped watering chamber affixed to said back of said plant chamber and extending along said back between said two ends, said watering chamber extending from the top edge of said back wall of said plant chamber downwardly for a distance less than the full height of said back wall and having a bottom midway of the height of said back wall, channel means extending from adjacent the bottom of said watering chamber through said back wall, thereby enabling water introduced in said watering chamber to flow into said plant chamber within a planting medium contained in said plant chamber;
    a drainage chamber affixed to each of said two side walls of said plant chamber at the bottom thereof and communicating with said plant chamber by way of openings extending through said side walls adjacent said bottom of said plant chamber, said drainage chambers being open topped to enable viewing of the level of water therein; and a plurality of ridges on the top of said bottom of said plant chamber, said ridges extending to direct water to flow in a circuitous path to said openings;

said bottom of said plant chamber being sloped from the center thereof downwardly toward each of said side walls.

12. The planter of claim 11 wherein said ridges extend partially across said bottom of said plant chamber alternately proceeding from said front and back walls.

13. The planter of claim 12 wherein said ridges proceeding from said front and back walls also proceed upwardly along said front and back walls respectively.

14. A planter comprising:

an open topped elongated plant chamber having a bottom, with a front wall, a back wall and two side walls depending from said bottom and extending generally upwardly therefrom with the top edges thereof at substantially the same height, said plant chamber being adapted to contain a planting medium;

an open topped watering chamber affixed to said back of said plant chamber and extending along said back between said two ends, said watering chamber extending from the top edge of said back wall of said plant chamber downwardly for a distance less than the full height of said back wall and having a bottom midway of the height of said back wall, channel means extending from adjacent the bottom of said watering chamber through said back wall, thereby enabling water introduced in said watering chamber to flow into said plant chamber within a planting medium contained in said plant chamber; and an drainage chamber affixed to each of said two side walls of said plant chamber, said drainage chambers extending for substantially the full height of said side walls and communicating with said plant chamber by way of openings extending through said side walls adjacent said bottom of said plant chamber, said drainage chambers being open topped to enable viewing of the level of water therein;

said bottom of said plant chamber being sloped from the center thereof downwardly toward each of said side walls.

15. The planter of claim 1 or 11 wherein said plant chamber is rectangular.

* * * * *